(12) United States Patent
Tanaka

(10) Patent No.: US 9,653,953 B2
(45) Date of Patent: May 16, 2017

(54) ROTOR WITH BLADE PORTIONS AND ROTATING ELECTRIC MACHINE HAVING THE SAME

(71) Applicant: DENSO CORPORATION, Kariya, Aichi-pref. (JP)

(72) Inventor: Asuka Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 14/097,947

(22) Filed: Dec. 5, 2013

(65) Prior Publication Data

US 2014/0152138 A1 Jun. 5, 2014

(30) Foreign Application Priority Data

Dec. 5, 2012 (JP) ................. 2012-266287

(51) Int. Cl.
*H02K 1/27* (2006.01)
*H02K 1/32* (2006.01)
*H02K 9/06* (2006.01)
*H02K 9/08* (2006.01)

(52) U.S. Cl.
CPC ............ *H02K 1/2746* (2013.01); *H02K 1/32* (2013.01); *H02K 9/06* (2013.01); *H02K 9/08* (2013.01)

(58) Field of Classification Search
CPC H02K 1/22; H02K 1/223; H02K 1/24; H02K 1/27; H02K 1/2706; H02K 1/28; H02K 1/30; H02K 5/15; H02K 9/04; H02K 9/06; H02K 9/08
USPC .......... 310/156.01, 156.12, 156.16, 216.011, 310/216.041, 216.114, 216.119, 216.013, 310/402, 405
See application file for complete search history.

(56) References Cited

U.S. PATENT DOCUMENTS 4,383,191 A * 5/1983 Mizuyama ............... H02K 9/18
310/269
4,745,320 A * 5/1988 Oyama .................... H02K 1/16
310/216.049

(Continued)

FOREIGN PATENT DOCUMENTS

CN 102497043 6/2012
JP H02219447 A * 9/1990

(Continued)

OTHER PUBLICATIONS

Machine translation of JPH02-219447A, Sep. 1990.*

(Continued)

*Primary Examiner* — John K Kim
*Assistant Examiner* — Minki Chang
(74) *Attorney, Agent, or Firm* — Nixon & Vanderhye P.C.

(57) ABSTRACT

A rotor for a rotating electric machine includes a core body having a through-hole, a magnet, a tubular portion, and a plate part having an opening. The through-hole passes through the core body in a thickness direction. The magnet is disposed on an outer wall of the core body. The tubular portion is placed radially-outward of the core body. The plate part seals at least one end of the tubular portion in an axial direction. The opening is provided at a position corresponding to the through-hole and passes through the plate part in a thickness direction. The through-hole is one of a plurality of the through-holes, and the magnet is one of a plurality of the magnets.

7 Claims, 6 Drawing Sheets

(56) References Cited

U.S. PATENT DOCUMENTS

| | | | | |
|---|---|---|---|---|
| 4,934,472 | A * | 6/1990 | Bloor | B62D 5/0463 |
| | | | | 180/446 |
| 6,700,287 | B2 * | 3/2004 | Ohmura | H02K 1/26 |
| | | | | 310/216.008 |
| 2007/0273232 | A1 * | 11/2007 | Ong | H02K 1/28 |
| | | | | 310/156.01 |
| 2008/0193275 | A1 | 8/2008 | De Filippis et al. | |
| 2012/0299406 | A1 * | 11/2012 | Hong | D06F 37/30 |
| | | | | 310/62 |
| 2014/0265739 | A1 * | 9/2014 | Iwai | H02K 9/06 |
| | | | | 310/60 R |

FOREIGN PATENT DOCUMENTS

| | | |
|---|---|---|
| JP | 08-065933 | 3/1996 |
| JP | 08065933 A * | 3/1996 |
| JP | 08-205438 | 8/1996 |
| JP | 2006042543 A * | 2/2006 |
| JP | 2008-182862 | 8/2008 |
| WO | WO2010/115539 A1 * | 10/2010 |

OTHER PUBLICATIONS

Machine translation of JP H02-219447 A.*
Machine translation of WO 2010/115539 A1.*
Machine translation of JP 2006-042543 A.*
Office Action (2 pages) dated Oct. 28, 2014, issued in corresponding Japanese Application No. 2012-266287 and English translation (2 pages).

* cited by examiner

ROTOR WITH BLADE PORTIONS AND ROTATING ELECTRIC MACHINE HAVING THE SAME

CROSS REFERENCE TO RELATED APPLICATION

This application is based on Japanese Patent Application No. 2012-266287 filed on Dec. 5, 2012, the disclosure of which is incorporated herein by reference in its entirety.

TECHNICAL FIELD

The present disclosure relates to a rotor and a rotating electric machine having the same.

BACKGROUND

Conventionally, a rotor is known to have a core body including a through-hole. In a rotor disclosed in JP-2008-182862A, a core body includes through-holes passing through the core body in a thickness direction, and the through-holes are arranged in a circumferential direction of the core body. Thus, the rotor may be lighter in weight and may have less inertia.

Further, the rotor has magnets and a magnet cover. The magnets are disposed on an outer wall of the core body to be arranged in the circumferential direction. The magnet cover has a tubular shape and is positioned radially-outward of the core body such that an inner wall of the magnet cover contacts to the magnets. An end of the magnet cover is sealed by a magnet holder. Thus, when the magnets are broken while the rotor rotates, pieces of the magnets are restricted from coming out through the end of the magnet cover.

However, when the magnet holder seals the end of the magnet cover, the through-hole is also sealed by the magnet holder. In this case, when the rotor rotates, the core body produces heat by eddy-current loss, and the heat may be retained in the through-holes. Therefore, temperature of the core body and temperature of the magnets are increased, and the magnets may be demagnetized by the heat. Accordingly, output power of a rotating electric machine may be decreased.

SUMMARY

It is an objective of the present disclosure to provide a rotor in which pieces of a broken magnet are restricted from coming out, and in which a core body can be cooled.

According to an example of the present disclosure, there is provided a rotor having: a core body; a through-hole passing through the core body in a thickness direction, wherein the through-hole is one of a plurality of the through-holes arranged in a circumferential direction of the core body; a magnet disposed on an outer wall of the core body, wherein the magnet is one of a plurality of the magnets arranged in the circumferential direction of the core body; a tubular portion placed radially-outward of the core body such that an inner wall of the tubular portion contacts with the magnet; a plate part sealing at least one end of the tubular portion in an axial direction of the core body; and an opening provided at a position of the plate part corresponding to the through-hole, the opening passing through the plate part in a thickness direction.

According to the present disclosure, the core body has the plurality of through-holes. Therefore, the rotor can be lighter in weight and has less inertia.

Moreover, the tubular portion is disposed radially-outward of the core body such that the inner wall of the tubular portion contacts to the magnet, and the plate part seals at least one end of the tubular portion. Therefore, when the rotor rotates and when the magnet is broken, pieces of a broken magnet are restricted from coming out of the tubular portion. Thus, the pieces of the broken magnet may not be stuck between the rotor and other parts, and rotating of the rotor is restricted from being stopped.

When the rotor rotates, the core body produces heat by eddy-current loss. The plate part has the opening passing through the plate part in the thickness direction at a position corresponding to the through-hole. Therefore, air from outside the core body can pass through the through-hole via the opening. Thus, the core body can be cooled. Accordingly, the magnet is restricted from being demagnetized by heat, and decreasing of output power of the rotating electric machine is restricted from happening.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
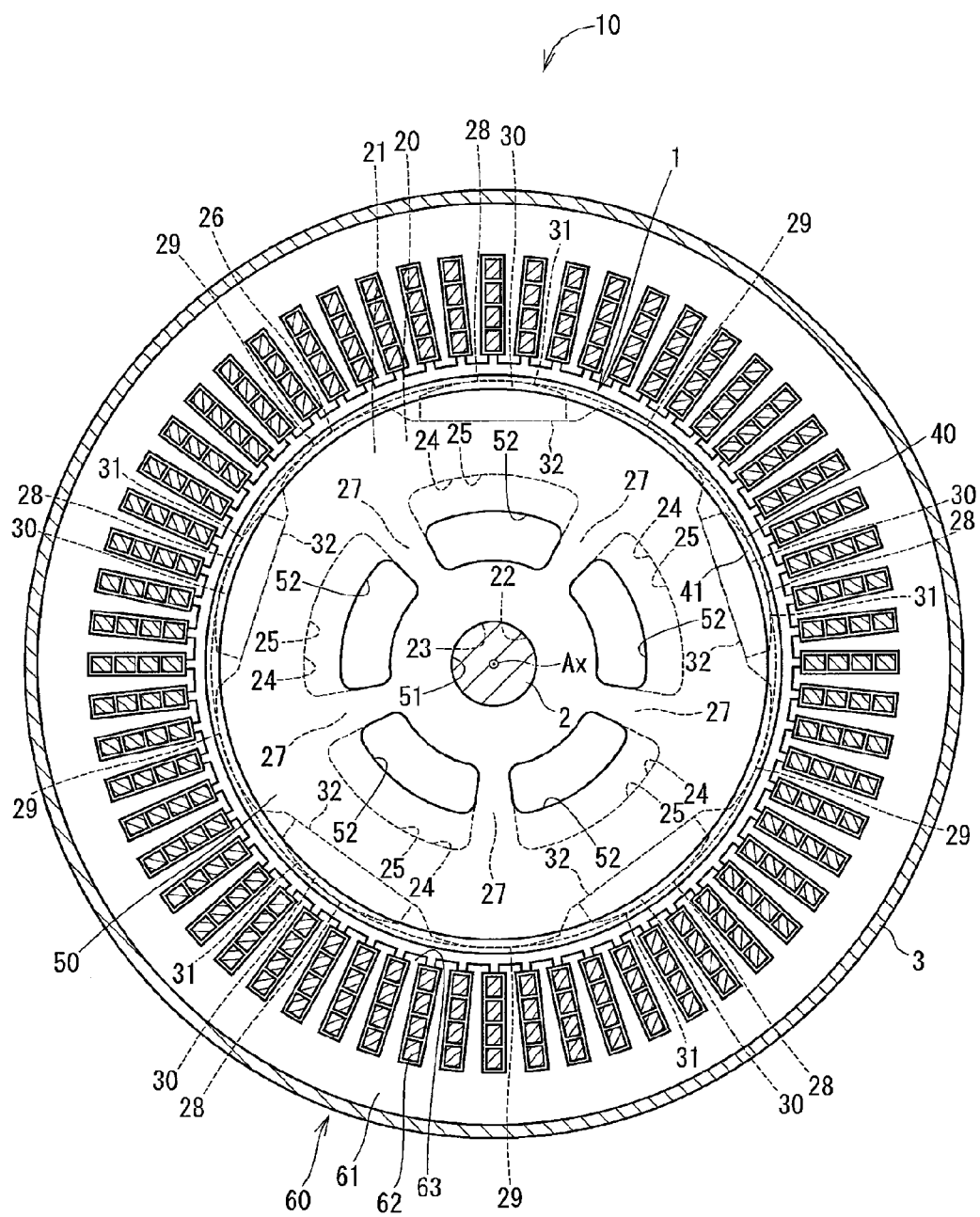
FIG. 1 is a cross-sectional view illustrating a rotor and a rotating electric machine according to a first embodiment.

FIG. 1 shows a rotating electric machine 10 according to a first embodiment.

The rotating electric machine 10 is used for a device such as an electric motor of an electric power steering device, which assists operating of a vehicle steering. The rotating electric machine 10 includes a rotor 1, a stator 60, a motor shaft 2, and a motor case 3.

As shown in FIG. 1, the rotor 1 has a core body 20, a through-hole 25, a magnet 30, a tubular portion 40, a plate part 50, and an opening 52.

The core body 20 is defined by thin plates 21 to have a cylindrical shape in a manner that the thin plates 21, which are made of a material such as iron, are laminated to form the core body 20. The thin plate 21 has a central hole 22 passing through the thin plate 21 in a thickness direction at a center of the thin plate 21. Therefore, when the thin plates 21 are laminated to form the core body 20, a shaft hole 23 passing through the core body 20 in a thickness direction is provided by the central hole 22 along a rotation axis Ax of the core body 20.

Figure 3:
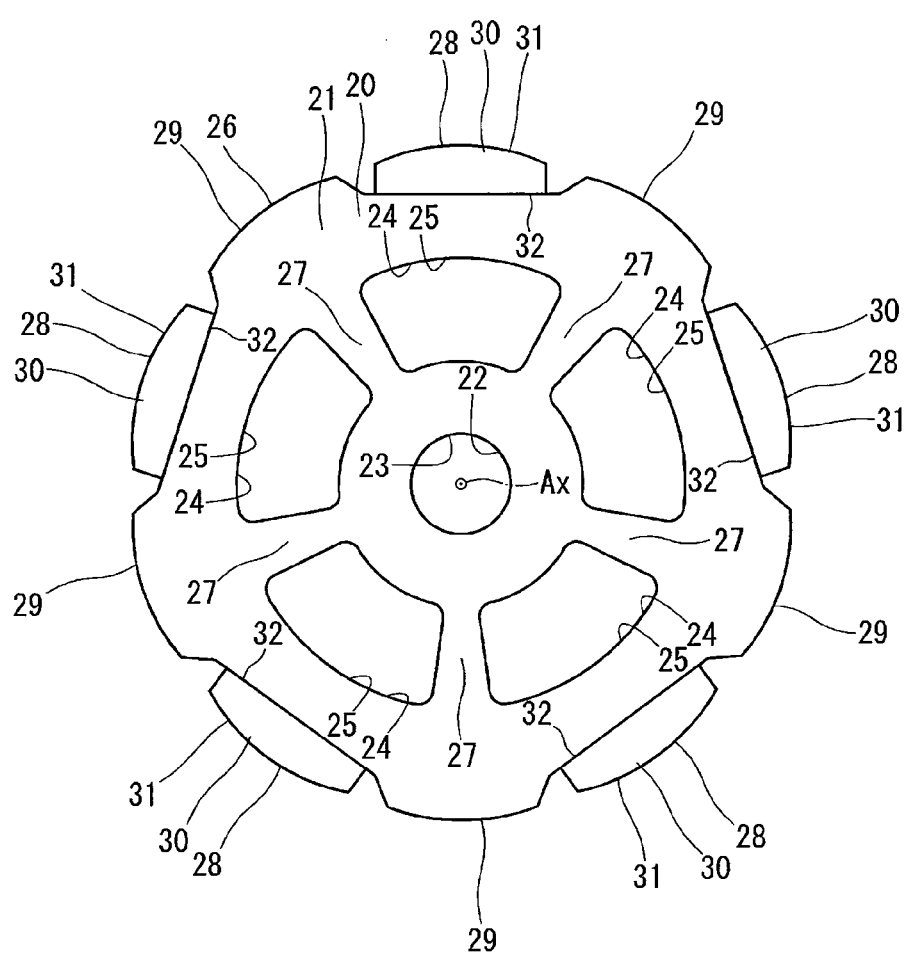
FIG. 3 is a partial cross-sectional view illustrating the rotor according to the first embodiment.

The thin plate 21 further has sector-shaped holes 24 radially-outward of the central hole 22, and the sector-shaped holes 24 are arranged in a circumferential direction of the thin plate 21 at a regular interval. The sector-shaped hole 24 passes through the thin plate 21 in the thickness direction. As shown in FIGS. 1 and 3, the sector-shaped hole 24 has a generally sector shape in cross-section. According to the first embodiment, the thin plate 21 has five of the sector-shaped holes 24. Therefore, when the thin plates 21 are laminated to form the core body 20, five of the through-holes 25 are provided by the sector-shaped holes 24 to be arranged in the circumferential direction at a regular interval.

The through-hole 25 is provided to pass through the core body 20 in the thickness direction and is positioned between the rotation axis Ax and a radially-outer wall 26 of the core body 20. The thin plates 21 are laminated so that wall surfaces of the sector-shaped holes 24 are integrated to form a smooth surface extending in a direction parallel with the rotation axis Ax. Therefore, the through-hole 25 is provided to extend in the direction parallel with the rotation axis Ax.

Further, when the core body 20 has the five of the through-holes 25, five spoke portions 27 are provided to be arranged between the through-holes 25 adjacent with each other in the circumferential direction.

A polar portion 28 and a polar portion 29 are alternately provided on the radially-outer wall 26 of the core body 20. The polar portion 28 is one of plural polar portions 28 arranged in the circumferential direction at a regular interval. The polar portion 29 is one of plural polar portions 29 positioned between the polar portions 28 adjacent with each other in the circumferential direction. That is, the polar portion 28 and the polar portion 29 are alternately arranged in the circumferential direction. According to the first embodiment, five of the polar portions 28 and five of the polar portions 29 are provided.

The polar portion 28 is positioned on the radially-outer side of the core body 20 with respect to the through-hole 25. The polar portion 28 has a curved-wall surface on a radially-outer side of the polar portion 28, and the curved-wall surface has a curved shape in cross-section taken along a line perpendicular to the rotation axis Ax.

The polar portion 29 is positioned on the radially-outer side of the core body 20 with respect to the spoke portion 27. The polar portion 29 has a curved-wall surface on a radially-outer side of the polar portion 29, and the curved wall surface has a curved shape in cross-section taken along a line perpendicular to the rotation axis Ax.

The magnet 30 has a rectangular-plate shape and is made of a permanent magnet such as a neodymium magnet. A longitudinal length of the magnet 30 is generally the same as a longitudinal length of the core body 20 in an axial direction. The magnet 30 has a curved-surface 31 having a curved shape and a flat-surface 32 having a flat shape. The magnet 30 is disposed to a position corresponding to the polar portion 28 such that the longitudinal direction of the magnet 30 is parallel with the rotation axis Ax. That is, five of the magnets 30 are arranged in the circumferential direction at a regular interval.

The magnet 30 is disposed such that the curved-surface 31 providing a part of an outer wall coincides with the curved-wall surface of the polar portion 28. That is, the curved-surface 31 is exposed from the outer wall of the core body 20. Thus, the rotor 1 according to the first embodiment is used for the rotating electric machine 10, which is a surface-permanent-magnet-type (SPM-type) rotating electric machine.

According to the first embodiment, the magnet 30 corresponds to the through-hole 25 in number and is disposed so that a center of the magnet 30 is on a straight line extending in the radial direction from the rotation axis Ax toward the magnet 30 via a center of the through-hole 25.

The magnet 30 is magnetized so that north pole is provided at the curved-surface 31, and that south pole is provided at the flat-surface 32. Accordingly, a magnetic flux produced by the magnet 30 passes through the polar portion 29, such that a magnetic pole is provided at the polar portion 28, and a pseudo-magnetic-pole is provided at the polar portion 29.

According to the first embodiment, the five of the magnets 30, the five of the polar portions 28, and the five of the polar portions 29 are used. That is, a number of the magnets 30 is half as many as a total number of the polar portions 28 and the polar portions 29. Thus, the number of the magnets 30 corresponds to a number of pole pairs. Therefore, the rotor 1 is used for the rotating electric machine 10 which is a half-magnet-type rotating electric machine.

Figure 2:
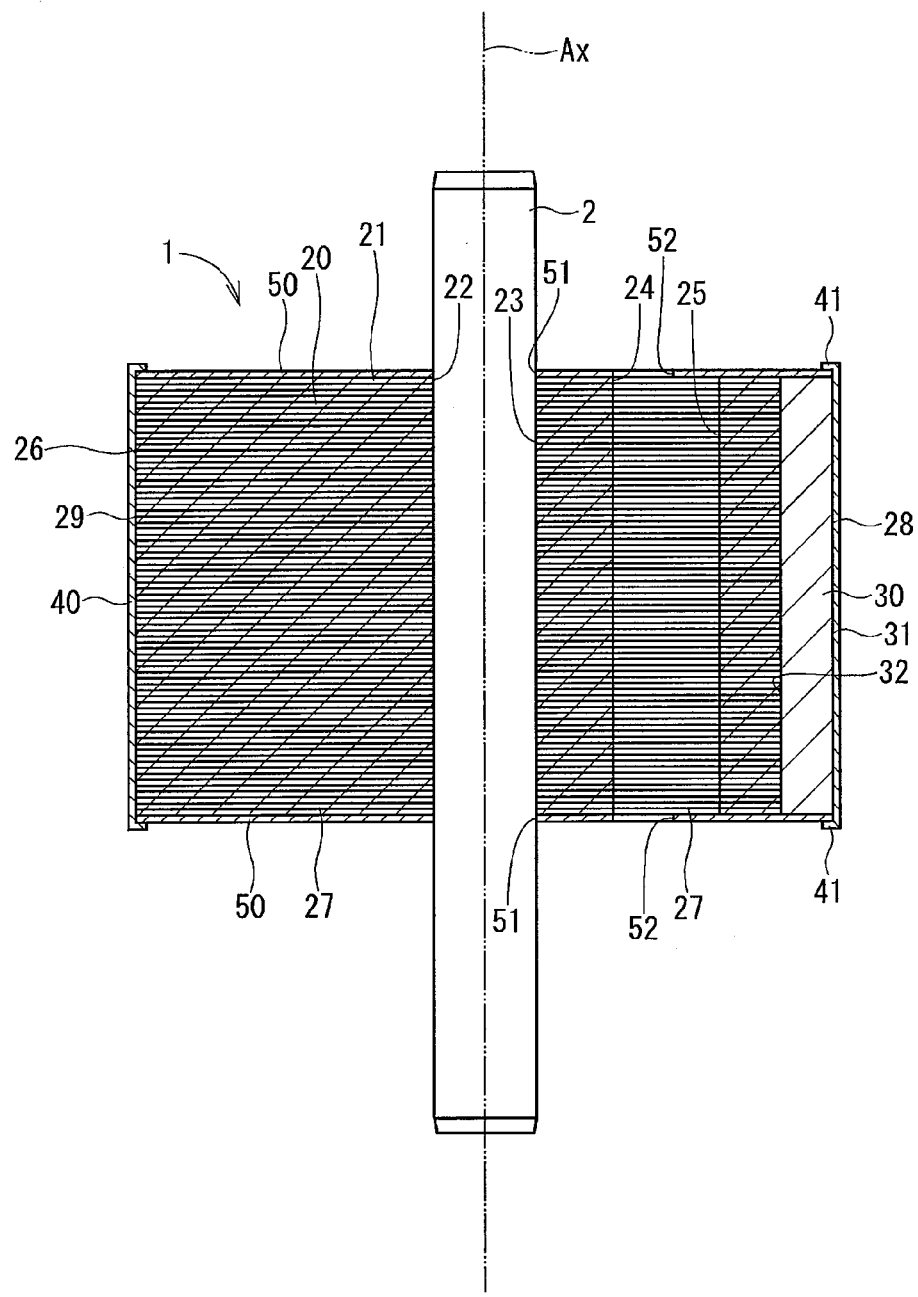
FIG. 2 is a cross-sectional view illustrating the rotor according to the first embodiment.

The tubular portion 40 is made of a non-magnetic material such as stainless and has a generally cylindrical shape. As shown in FIGS. 1 and 2, the tubular portion 40 is positioned on a radially-outer side of the core body 20 so that an inner wall of the tubular portion 40 contacts with the curved-surface 31 of the magnet 30. Accordingly, the magnet 30 is fixed to the outer wall of the core body 20 without using an adhesive.

The plate part 50 is made of a non-magnetic material such as stainless and has a generally discoid shape. According to the first embodiment, as shown in FIG. 2, two of the plate parts 50 are disposed to the tubular portion 40 so that both ends of the tubular portion 40 in the axial direction are closed. The plate part 50 has a center hole 51 at a center of the plate part 50, and the center hole 51 passes through the plate part 50 in a thickness direction.

The opening 52 is provided on a radially-outer side of the center hole 51 of the plate part 50 such that the opening 52 passes through the plate part 50 in the thickness direction. According to the first embodiment, five of the openings 52 are provided so that the opening 52 of the plate part 50 is positioned at a position corresponding to the through-hole 25. That is, the five of the openings 52 are arranged in a circumferential direction of the plate part 50 at a regular interval. Similar to the sector-shaped hole 24, the opening 52 has a generally sector shape in cross-section, and a cross-sectional area of the opening 52 is smaller than a cross-sectional area of the sector-shaped hole 24 of the thin plate 21 (i.e., a cross-sectional area of the through-hole 25), as shown in FIG. 1.

As shown in FIGS. 1 and 2, an annular portion 41 is formed by bending the both ends of the tubular portion 40 radially-inward. The annular portion 41 holds the plate part 50 by contacting to the plate part 50 on an opposite side of the core body 20 and the magnet 30. Therefore, the plate part 50 is restricted from moving away from the end of the tubular portion 40. The plate part 50 supports the magnet 30 so that the magnet 30 is restricted from coming out of the tubular portion 40. Moreover, the plate part 50 closes the end of the tubular portion 40 so that pieces of the magnet 30 are restricted from coming out of the tubular portion 40 when the magnet 30 gets broken.

As shown in FIG. 1, the stator 60 includes a core body 61 and a winding wire 62.

The core body 61 is made by laminating thin plates such as iron thin plates, and the core body 61 has a generally annular shape. The core body 61 has a teeth portion 63 extending radially-inward. According to the first embodiment, the core body 61 has sixty of the teeth portions 63 arranged in a circumferential direction of the core body 61 at a regular interval.

The winding wire 62 is made of metal such as copper and disposed to the core body 61 so as to fill spaces between the sixty of the teeth portions 63. Plural phases are provided by the winding wire 62 in the rotating electric machine 10.

The motor shaft 2 is made of a material such as metal to have a rod shape and supported in the rotor 1 to pass through the center hole 51 of the plate part 50 and the shaft hole 23 of the core body 20. The motor case 3 is made of a material such as metal to have a generally cylindrical shape. Both ends of the motor case 3 are closed by end frames (not shown). The motor case 3 therein houses the rotor 1 and the stator 60. The stator 60 is fixed inside the motor case 3 such that a radially-outer wall of the core body 61 contacts to an inner wall of the motor case 3.

Both ends of the motor shaft 2 are held by the end frames closing the both ends of the motor case 3. Therefore, the rotor 1 rotates inside the stator 60 disposed in the motor case 3. When an electric power is applied to the winding wire 62 of the stator 60, a rotating magnetic field is provided at the stator 60. The rotor 1 rotates integrally with the motor shaft 2 based on the rotating magnetic field. Accordingly, the motor shaft 2 outputs rotation of the rotating electric machine 10.

As described above, the core body 20 has the through-holes 25. Accordingly, the rotor 1 can be lighter in weight and can have less inertia.

The tubular portion 40 is disposed on the radially-outer side of the core body 20 so that the inner wall of the tubular portion 40 contacts to the magnet 30. The plate part 50 is disposed to close the both ends of the tubular portion 40. Therefore, according to the rotating electric machine 10 of the first embodiment, when the magnet 30 gets broken, pieces of the magnet 30 are restricted from coming out of the tubular portion 40. Thus, the pieces of the magnet 30 are restricted from being stuck between the rotor 1 and other parts (e.g., the stator 60), and the rotor 1 is restricted from stop rotating.

When the tubular portion 40 is disposed on the radially-outer side of the core body 20 so that the inner wall of the tubular portion 40 contacts to the magnet 30, the magnet 30 can be fixed to the outer wall of the core body 20 without using an adhesive. Therefore, producing cost of the rotor 1 can be reduced.

When the rotor 1 rotates, the core body 20 produces heat based on eddy-current loss. According to the first embodiment, the plate part 50 has the opening 52 at the position corresponding to the through-hole 25, and the opening 52 passes through the plate part 50 in the thickness direction. Therefore, outside air of the core body 20 can come in from the opening 52 and flow through the through-hole 25, such that the core body 20 can be cooled. Accordingly, the magnet 30 can be restricted from being demagnetized by heat. Thus, output-power reduction of the rotating electric machine 10 can be restricted.

According to the first embodiment, the plural through-holes 25 are arranged in the circumferential direction of the core body 20 at a regular interval. Accordingly, the rotation balance of the rotor 1 can be improved. Moreover, strength of the core body 20 in the circumferential direction can be uniform, such that a width of the spoke portion 27 in the circumferential direction is fixed to a regular value.

Second Embodiment

Figure 4:
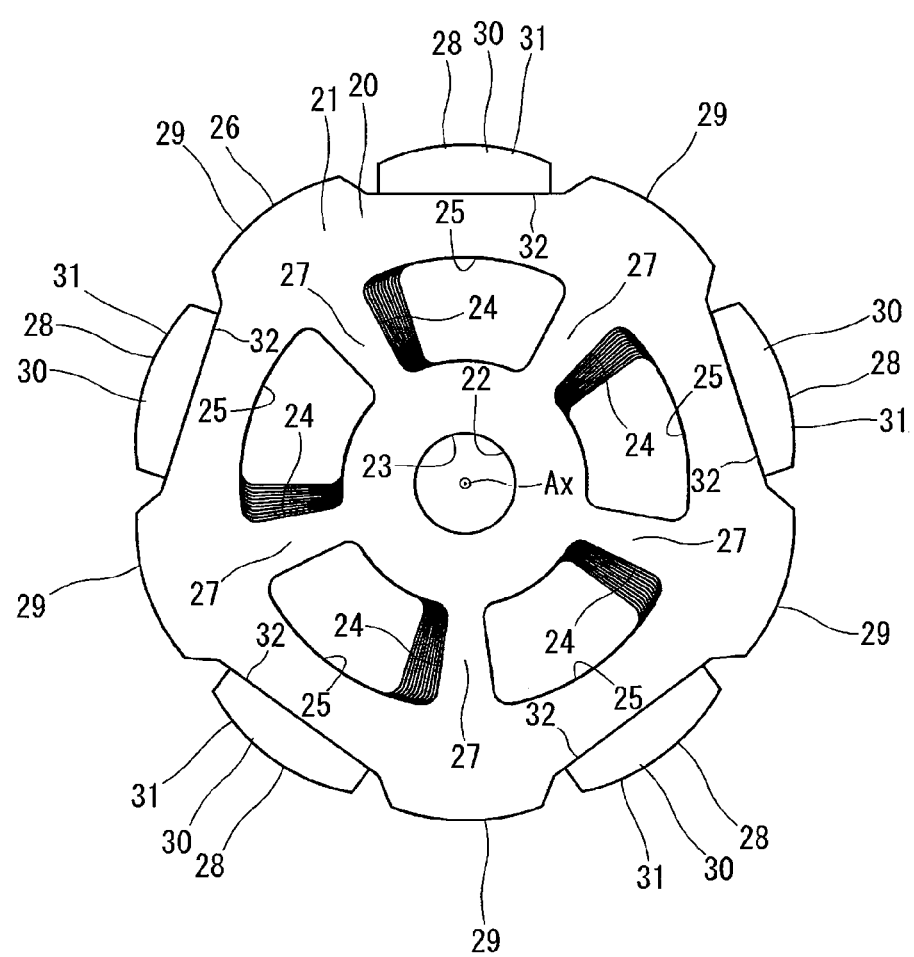
FIG. 4 is a partial cross-sectional view illustrating a rotor according to a second embodiment.

FIG. 4 partially shows a rotor for a rotating electric machine according to a second embodiment. For example, the through-hole 25 is modified to have a different shape from the through-hole 25 of the first embodiment.

According to the second embodiment, of the thin plates 21 laminated to form the core body 20, the positions of the sector-shaped holes 24 are shifted by a predetermined dimension in the circumferential direction. Thus, when the thin plates 21 are laminated to form the core body 20, the through-hole 25 is provided to extend helically around the rotation axis Ax. That is, the through-hole 25 has a spiral shape.

The through-hole 25 extends to turn around the rotation axis Ax. Accordingly, when the rotor rotates, a swirl flow is produced in the through-hole 25. Therefore, a flow amount of air passing through the through-hole 25 is increased, and the core body 20 can be cooled more effectively. Thus, the output-power reduction can be restricted more effectively.

Third Embodiment

Figure 5:
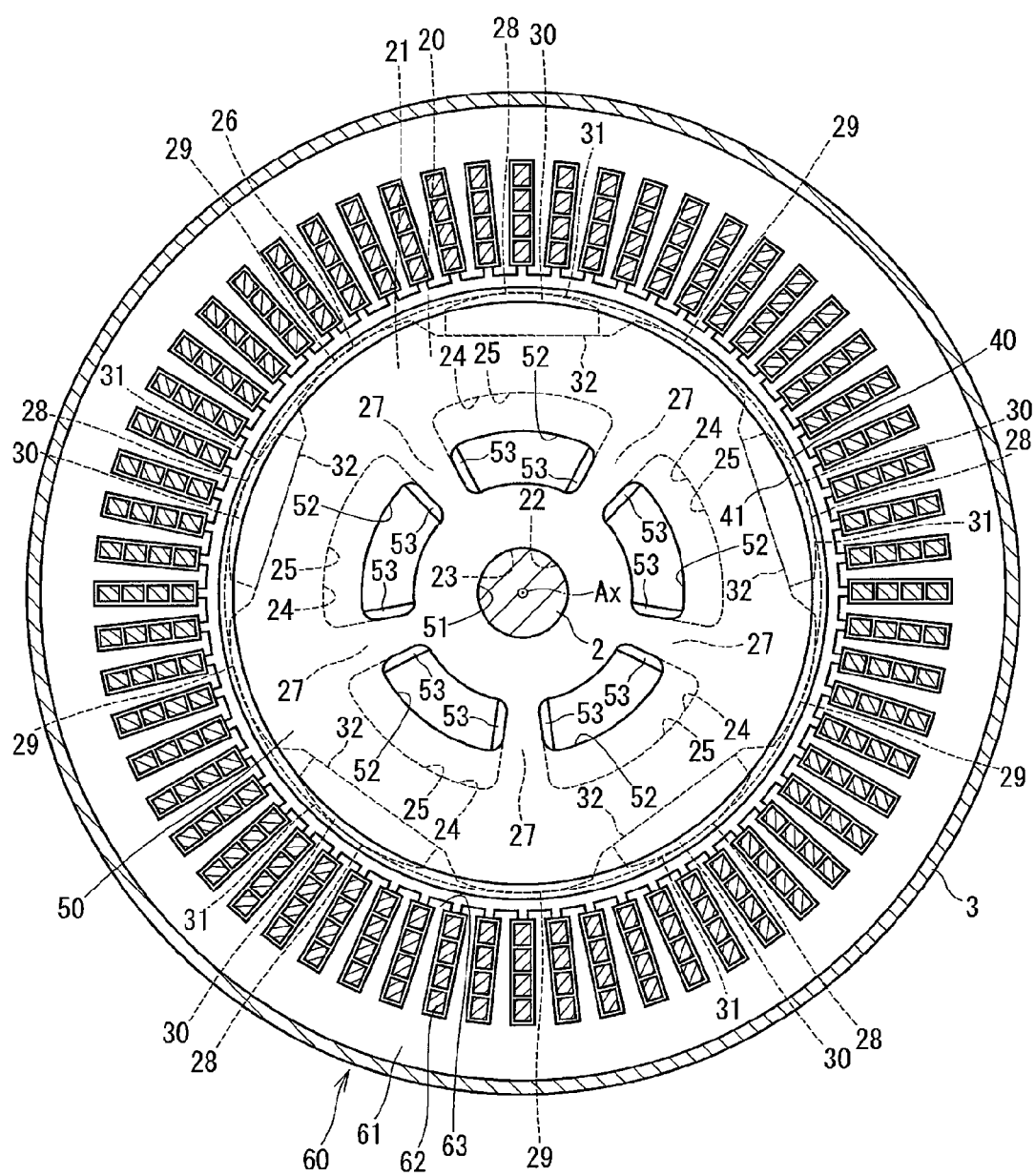
FIG. 5 is a cross-sectional view illustrating a rotor and a rotating electric machine according to a third embodiment.

FIG. 5 shows a rotating electric machine according to a third embodiment. For example, the opening 52 of the first embodiment is modified in the third embodiment.

Figure 6:
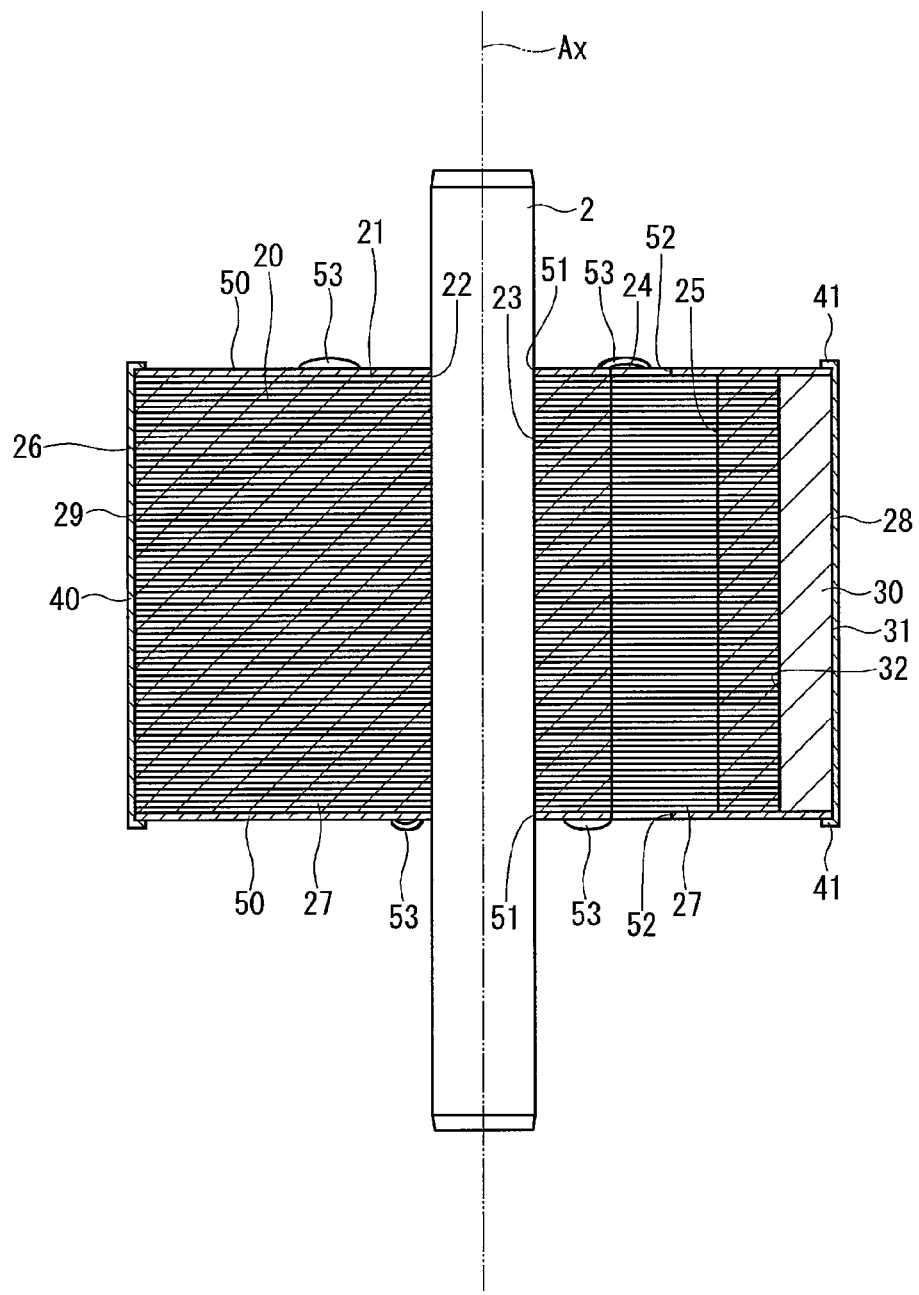
FIG. 6 is a cross-sectional view illustrating the rotor according to the third embodiment.

A rotor according to the third embodiment further has a blade portion 53 which pushes against air when the rotor is rotated. The blade portion 53 is defined integrally with the plate part 50, and extends in a circumferential direction of the plate part 50 from an edge of the opening 52 away from a surface of the plate part 50 opposite to the core body 20, as shown in FIGS. 5 and 6. The opening 52 is constructed by two edges opposing with each other in the radial direction and two edges opposing with each other in the circumferential direction. A distance between the two edges opposing with each other in the radial direction is smaller than a distance between the two edges opposing with each other in the circumferential direction. The blade portions 53 is provided to the two edges opposing with each other in the circumferential direction. The blade portion 53 has a curved-plate shape so as to contact smoothly to the edge of the opening 52, as shown in FIG. 6.

Accordingly, when the rotor rotates, air is taken in from outside the core body 20 to pass through the through-hole 25. Therefore, an air amount passing through the through-hole 25 is increased, and the core body 20 can be cooled more effectively. Thus, output power of the rotating electric machine can be restricted from decreasing.

The blade portion 53 has the curved-plate shape to smoothly contact to the edge of the opening 52. Accordingly, when the rotor rotates, air flow resistance produced by the blade portion 53 can be decreased.

OTHER MODIFICATIONS

Although a plate part closes both ends of a tubular portion according to above embodiments, the plate part may close only one end of the tubular portion.

Through-holes are not limited to be arranged in a circumferential direction of a core body at a regular interval. A number of the through-holes is not limited to five, and may be two to four. Alternatively, the number of the through-holes may be more than or equal to six.

Openings of the plate part are not limited to be arranged in the circumferential direction at a regular interval in so far as an opening is provided at a position corresponding to the through-hole. A number of the openings is not limited to five in so far as the number of the opening is the same as many as a number of the through-holes, and may be two to four. Alternatively, the number of the openings may be more than or equal to six. The opening of the plate part may be the same shape as the through-hole, and may have the size bigger than or equal to the through-hole (i.e., an opening of a thin plate).

Although the opening of the plate part has one blade portion according to the third embodiment, the opening of the plate part may have plural blade portions. The blade portion is not limited to extend outward away from the surface of the plate part opposite to the through-hole, and may extend inward inside the through-hole. The blade portion is not limited to have a curved-plate shape to smoothly contact to the edge of the opening and may have a flat-plate shape.

On the core body of the rotor, a polar portion may extend to turn around a rotation axis of the core body. In this case, a magnet disposed on an outer wall of the core body may extend to turn around the rotation axis of the core body. Accordingly, cogging torque and torque ripple of the rotating electric machine may be decreased.

The above embodiments may be combined in so far as there is no obstructive factor for a structure. For example, in a combination of the second embodiment and the third embodiment, the through-hole extends to turn around the rotation axis of the core body. Further, the blade portion, which extends in the circumferential direction from the edge of the opening of the plate part toward the surface of the plate part, is defined.

The magnet may be positioned on a radially-outer side of a spoke portion of the core body.

The magnet may be fixed to the outer wall of the core body by a method such as adhesive.

The magnet may be the same as many as the polar portions. That is, the rotor having such a structure may be used for a full-magnet-type rotating electric machine.

The core body is not limited to be formed by laminating the thin plates and may be made by a method such as molding and cutting work.

The rotating electric machine having the rotor is not limited to be an electric power steering device and may be used as a driving source for other devices and machines.

Such changes and modifications are to be understood as being within the scope of the present disclosure as defined by the appended claims.

What is claimed is:

1. A rotor for a rotating electric machine, comprising:
 a core body that has a plurality of through-holes passing through the core body in a thickness direction and arranged in a circumferential direction of the core body;
 a plurality of magnets disposed on an outer wall of the core body and arranged in the circumferential direction of the core body;
 a tubular portion placed radially-outward of the core body such that an inner wall of the tubular portion contacts with the plurality of magnets;
 a first plate part that seals one end of the tubular portion in an axial direction of the core body; and
 a second plate part that seals an other end of the tubular portion in the axial direction, wherein
 each of the first plate part and the second plate part has an opening that passes through the first plate part and the second plate part in a thickness direction,
 the opening is located at a position corresponding to each of the plurality of through-holes and has a first edge and a second edge facing each other in the circumferential direction,
 the first plate part has
  a first blade portion that directly extends only from the first edge of the opening in the circumferential direction away from a surface of the first plate part and
  a third blade portion that directly extends from the second edge of the opening on the first plate part, such that the first blade portion and the third blade portion oppose each other in the circumferential direction,
 the second plate part has a second blade portion that directly extends only from the second edge of the opening in the circumferential direction away from a surface of the second plate part,
 the first blade portion has a curved-plate shape and directly extends only from the first edge of the opening while being curved,
 the second blade portion has a curved-plate shape and directly extends only from the second edge of the opening while being curved, and
 the first blade portion or the second blade portion receives air in the circumferential direction and guides the air to flow into the plurality of the through holes when rotor rotates.

2. The rotor according to claim 1, wherein
 the plurality of through-holes are arranged in the circumferential direction at a regular interval.

3. The rotor according to claim 1, wherein
 each of the plurality of through-holes extends helically around an axis of the core body.

4. A rotating electric machine comprising: the rotor according to claim 1; and a stator disposed radially-outward of the rotor to provide a rotating magnetic field based on electric power applied to the stator.

5. The rotor according to claim 1, wherein
 the first blade portion directly extends from the first edge toward the second edge in the circumferential direction away from the surface of the first plate part, and
 the second blade portion directly extends from the second edge toward the first edge in the circumferential direction away from the surface of the second plate part.

6. The rotor according to claim 1, wherein
 the rotor is used as a driving source for an electric power steering device.

7. The rotor according to claim 1, wherein the second plate part has a fourth blade portion that directly extends from the first edge of the opening on the second plate part, such that the second blade portion and the fourth blade portion oppose each other in the circumferential direction.

\* \* \* \* \*